United States Patent
Johnson et al.

(10) Patent No.: US 9,971,544 B1
(45) Date of Patent: May 15, 2018

(54) TECHNIQUES FOR USAGE METERING AND CONTROL IN DATA STORAGE SYSTEMS

(71) Applicant: Amazon Technologies, Inc., Seattle, WA (US)

(72) Inventors: Jeffrey Arthur Johnson, Seattle, WA (US); Colin Laird Lazier, Seattle, WA (US); Evelina Colleen Babcock, Everett, WA (US); Mark Christopher Seigle, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 106 days.

(21) Appl. No.: 14/856,445

(22) Filed: Sep. 16, 2015

(51) Int. Cl.
| | | |
|---|---|---|
| *G06F 15/16* | (2006.01) | |
| *G06F 3/06* | (2006.01) | |
| *H04L 29/08* | (2006.01) | |
| *H04L 12/26* | (2006.01) | |
| *G06F 11/08* | (2006.01) | |
| *G06F 17/30* | (2006.01) | |
| *H04L 29/06* | (2006.01) | |

(52) U.S. Cl.
CPC ............ *G06F 3/0653* (2013.01); *G06F 3/065* (2013.01); *G06F 3/067* (2013.01); *G06F 3/0613* (2013.01); *G06F 3/0619* (2013.01); *G06F 3/0665* (2013.01); *G06F 3/0689* (2013.01); *G06F 11/085* (2013.01); *G06F 17/30073* (2013.01); *G06F 17/30194* (2013.01); *H04L 43/0894* (2013.01); *H04L 67/1097* (2013.01); *H04L 69/16* (2013.01); *H04L 69/326* (2013.01)

(58) Field of Classification Search
CPC ......... G06F 17/30073; G06F 17/30194; H04L 69/16; H04L 69/326
USPC .................................. 709/203, 224; 707/823
See application file for complete search history.

(56) References Cited

U.S. PATENT DOCUMENTS 8,131,784 B1 *   3/2012   Zhuge ............... G06F 17/30073
                                                               707/823
2014/0304320 A1 * 10/2014  Taneja .................... H04L 69/16
                                                               709/203

* cited by examiner

*Primary Examiner* — Kyung H Shin
(74) *Attorney, Agent, or Firm* — Davis Wright Tremaine LLP

(57) ABSTRACT

A data storage system synchronously or asynchronously determines data storage usage policies in connection with incoming data storage requests so as to improve policy compliance and system efficiency. In some embodiments, a synchronous usage meter is used to make such policy decisions, and variously implement consistent hashing techniques to improve system availability and efficiency. In some embodiments, an asynchronous usage meter is used, and is implemented using an ordered queueing engine so as to improve the accuracy of policy decisions.

20 Claims, 10 Drawing Sheets

TECHNIQUES FOR USAGE METERING AND CONTROL IN DATA STORAGE SYSTEMS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

As the demand for network-based storage services such as archival storage services grows, however, setting, enforcing, and otherwise handling usage limits becomes increasingly more complex. Furthermore, peaky and/or inconsistent system loads may add additional challenges to administrators of such systems wishing to regulate the flow of data into and out of the systems.

BRIEF DESCRIPTION OF THE DRAWINGS

Various techniques will be described with reference to the drawings, in which.

DETAILED DESCRIPTION

Figure 1:
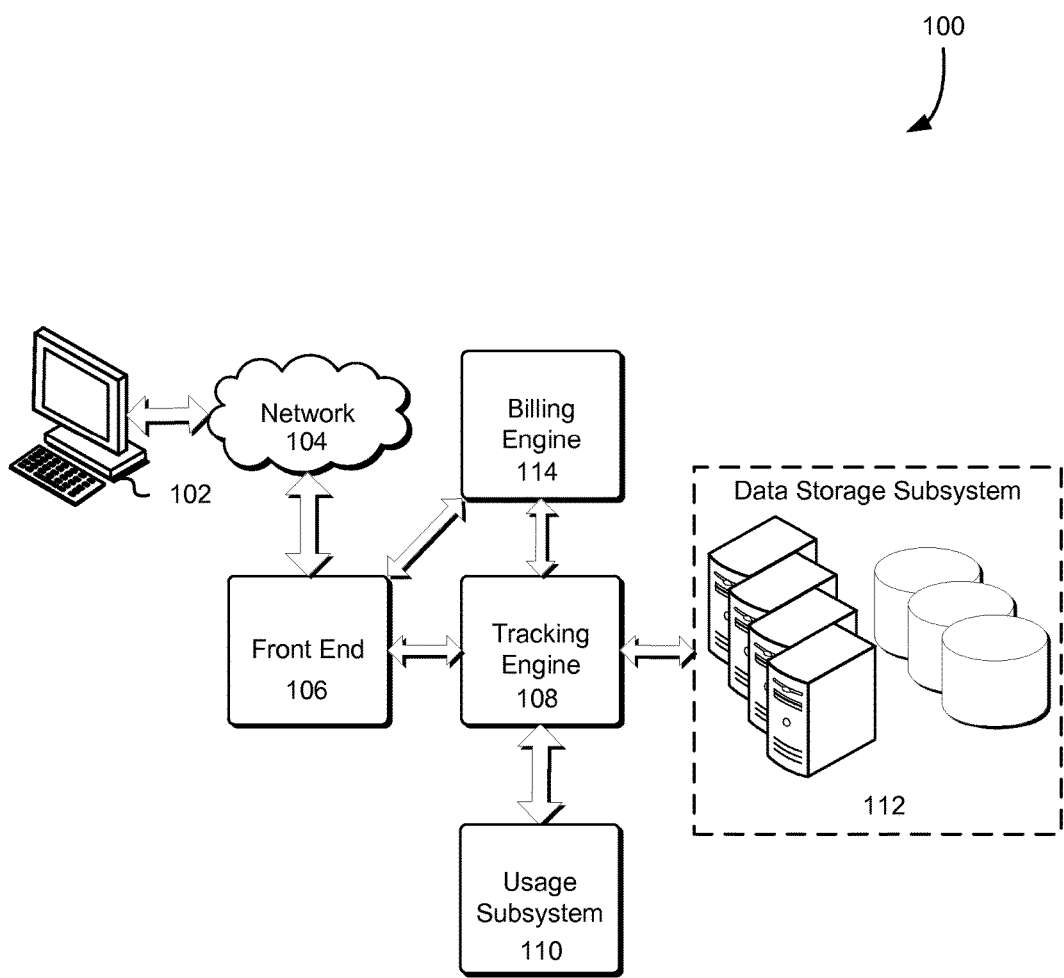
FIG. 1 illustrates an environment in which a usage subsystem for processing data storage requests is implemented, in accordance with some embodiments.

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In one example, a customer, via one or more customer devices, connects to a data storage system via a network. The data storage system may be an archival storage system to which the customer device has programmatic access, such as via web service calls or application programming interface calls. The data storage system receives data storage requests from the customer device and, in turn, makes a determination as to whether the incoming data storage requests comply with usage policies defined by, e.g., the customer, the data storage system, and the like. Such determinations may be either synchronous or asynchronous relative to the request, and are executed via a usage subsystem of the data storage system.

In the case of a synchronous determination, the data storage system may implement a usage subsystem that includes a consistent hashing mechanism, such as a consistent hash ring that includes a plurality of hosts, for looking up and calculating a given customer's applicable usage policy at the time of the data storage request. Other parameters that may be assessed include the duration of the data storage request, the quantity and identity of the data storage requested in the request, and the like. In such embodiments, the distributed nature of the entities performing the lookup and calculation allow the data storage request to be denied or approved in a short enough timeframe so as to respond to the requesting customer device synchronously with the request. Furthermore, the usage subsystem may be configured to fail open—that is, if the usage subsystem malfunctions or is unavailable, the data storage system services the requests as if they were allowed (and thereby executes the requests).

In the case of an asynchronous determination, the data storage system may implement a usage subsystem that includes an ordered queueing system, which guarantees that incoming requests are held in a queue that returns the requests in a specified order (e.g., the same order in which they were received). In some of such embodiments, the requests are assigned to a specific data segment or fragment, such that the assignments are idempotent, thereby allowing for the requests to be serviced in the same order they were initially received even if a determining host becomes unavailable, if the requests are repeated, etc. An asynchronous usage meter, which may include one or more hosts capable of making a determination of a request's expected data usage against an usage policy applicable at the time of the request, traverses the data segments or fragments so as to assess the requests in the order guaranteed by the ordered queueing system. The hosts of the asynchronous usage meter hold information regarding the applicable usage policies in transient memory, make the determination, then pass the result asynchronously for further processing and/or notification (e.g., to the customer device).

As may be contemplated, usage subsystems may decrease the frequency of non-compliance with data usage policies, thereby allowing customers to more accurately control costs and request flow, as well as allowing data storage systems to improve service stability, availability, and cost control. Additional improvements along these lines may be achieved by implementing post-processing of usage data. In one example, a billing engine calculates effective usage policies for specified intervals, such as intervals of time, and applies those effective usage policies to actual usage data so as to adjust the usage amount billed to a given customer. In such an example, the usage policies in effect over a specified period of time may be keyed to both a periodic interval of time (e.g., hourly), as well as when usage policies are changed (e.g., by the customer). Thus, if a given data storage request is initiated prior to a change in usage policy, the effective usage policy applied for a specified period of time may follow the prior usage policy, rather than the later one, regardless of the usage policy in effect at the end of the periodic interval of time. The usage data billed to the customer may thus be adjusted in accordance, thereby improving the accuracy of billing while also allowing the customer to improve control over costs (e.g., over uncontrolled usage, or usage under more rudimentary control).

FIG. 1 illustrates an environment in which a usage subsystem for processing data storage requests is implemented, in accordance with some embodiments. A customer, via one or more customer devices 102, connects to a front end 106 of a data storage system via a network 104 so as to submit data storage requests (e.g., requests to retrieve and/or store data on a data storage system) and retrieve and submit information related to data storage requests (such as status information regarding the requests, the actual data requested, and the like).

The customer may be an organization that may utilize one or more of the services provided by a computing resource service provider, such as the data storage system 100, to maintain and deliver information to its employees, which may be located in various geographical locations. Additionally, the customer may be an individual that utilizes the services of the computing resource service provider to deliver content to a working group located remotely. The customer device 102 may be any computing resource or collection of such resources enabling the customer to interface with the data storage system, such as in a programmatic fashion (e.g., via web service call or application programming interface call), and transact data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network 104 may be a communication network, such as the Internet, an intranet or an Internet service provider (ISP) network. Some communications from the customer device 102 to the data storage system may cause the data storage system to operate in accordance with one or more embodiments described or a variation thereof. The front end 106 may be any entity capable of interfacing via a network with a customer device 102, as well as various other components of a data storage system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those accessible via application programming interface calls, web service calls, or other programmatic methods), and the like.

Requests from the customer device 102 may be passed by the front end 106 to a tracking engine 108 for further processing. The tracking engine 108 may be any entity capable of interfacing with the front end 106 and routing requests to be processed by the usage subsystem 110, as well as receiving decision information back from usage subsystem 110 and acting in accordance with the decision information as well as the content of the applicable data storage requests (e.g., if the decision of the usage subsystem 110 is to approve the request, then the tracking engine 108 may kick off a workflow to store or retrieve the data in the data storage request in/from the data storage subsystem). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those accessible via application programming interface calls, web service calls, or other programmatic methods), and the like.

The tracking engine 108 passes information regarding the data storage request to the usage subsystem 110 for further determination of whether the incoming data storage request complies with an applicable usage policy for the data storage request. The usage subsystem 110 may, as described in greater detail herein, process the incoming data storage requests either asynchronously or synchronously, depending on the implementation. The usage policies may be set by the customer (via the customer device 102), by an entity of the data storage system, or some combination of the two. For example, multiple usage policies may apply to a given data storage request, and such multiple usage policies may applied in either an additive, subtractive, presumptive (e.g., one policy overrides another), or independent (e.g., multiple policies apply independently and do not necessarily interact) fashion. Various current, actual, and forecasted parameters may be used to make the determination, such as the duration of the request, the time at which the request was submitted, the system load (e.g., data storage subsystem 112 load, front end 106 load, and the like), the type of data (e.g., confidential, etc.) requested, customer identity, and the like.

In some embodiments, the determination of usage policy compliance may be conducted such that any failure of the usage subsystem 110 to make a timely determination (e.g., in the case where the determination is to be synchronously returned to the requestor) does not necessarily prevent the data storage request from being serviced. In other words, communications between the tracking engine 108 and the usage subsystem 110 fail "open," and thus the implementation of a usage subsystem 110 in such a fashion allows the benefits of usage determination without unduly affecting the overall availability of the data storage system to, e.g., customer devices 102. In scenarios where the usage subsystem fails, e.g., becomes unavailable or otherwise cannot make an usage determination, to the extent that the data storage request is serviced and exceeds or otherwise violates one or more applicable usage policies, the amount of usage allowed by the applicable usage policies may be billed, but, in some embodiments, overages beyond the applicable usage policies are not (e.g., absorbed by the system).

The usage subsystem 110 performs its determination, either synchronously or asynchronously, and returns its decision to the tracking engine 108 for further processing and disposition. If the usage subsystem 110 decides to deny the data storage request, information regarding the denial is returned to the requestor, e.g., the customer device 102, either synchronously or asynchronously depending on the implementation. If the usage subsystem 110 decides to approve the data storage request (either completely, partially, or in modified form), information regarding the approval is returned to the requestor, e.g., the customer device 102, either asynchronously or asynchronously depending on the implementation, and the tracking engine 108 further kicks off a storage processing workflow with the data storage subsystem 112 to store the data associated with the request in accordance with the request, and in some cases, in accordance with the conditions and/or modifications enforced by the decision of the usage subsystem 110 (e.g., spreading the storage job out over a longer period of time, only storing part of the data, etc.).

To the extent that a storage processing workflow fails to be initialized or executed in accordance with a positive usage determination (i.e., that which results in a storage request being granted), the tracking engine 108 "returns" usage that, under ordinary circumstances where the storage processing workflow initializes and executes successfully, would have resulted in the usage subsystem 110 counting the associated usage against the usage policy/ies (and accordingly updated records or other information associated with the usage in the usage data store). The tracking engine 108 "returns" such usage by updating, through, for example, a usage meter or other component of the usage subsystem 110, associated records accounting for the usage so as to reflect a quantity of usage that is consistent with the storage request not having been made.

The data storage subsystem 112 may be any computing resource or collection of such resources capable of processing data for storage, and either storing and/or interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., via application programming interface calls, web service calls, or other programmatic methods), and the like.

In some embodiments, the data storage subsystem 112 may combine various types of such resources, such as a storage server connected to a plurality of storage devices. In some embodiments, the resources of the data storage subsystem 112 may be one or more resources of a computing resource service provider, such as that described in further detail below. In some embodiments, the data storage subsystem 112 and/or the computing resource service provider provides one or more archival storage services and/or data storage services, such as those described in further below, through which the customers may transact data such as data in connection with data storage requests (e.g., to store original data) received from the customers.

As previously mentioned, in some embodiments, the data stored by the data storage subsystem 112 may be processed, as part of the storage workflow, to include a plurality of encoded shards that were derived by applying a redundancy code (e.g., erasure code) to the original data associated with the data storage request. The redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied.

In embodiments where a resultant data set includes shards associated with the original data, the shards in the data set may be used to reconstruct information from the data set, such as by inverting the previously applied redundancy coding matrix, or by generating a checksum or applying a hash function thereto. Further, in such embodiments, verification of the stored data set may be executed by comparing the reconstructed information with analogous information related to the original data. For example, the reconstructed information may be directly compared to the original data so as to ascertain that they are the same. As another example, the reconstructed information may be compared to a function or value associated with the original data, such as a hash value (e.g., as derived from a hash function applied to the original data as well as any reconstructed information) or a checksum, so as to ascertain that they match.

The billing engine 114 may be any entity capable of interfacing with the front end 106 and tracking engine 108, and, in some embodiments, the data storage subsystem 112, so as to assess usage patterns and appropriately bill customers for usage. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like. The billing engine 114 may be involved in post-processing of usage records against, for example, applicable usage policies, so as to accurately determine the appropriate amount to charge a given customer.

Figure 2:
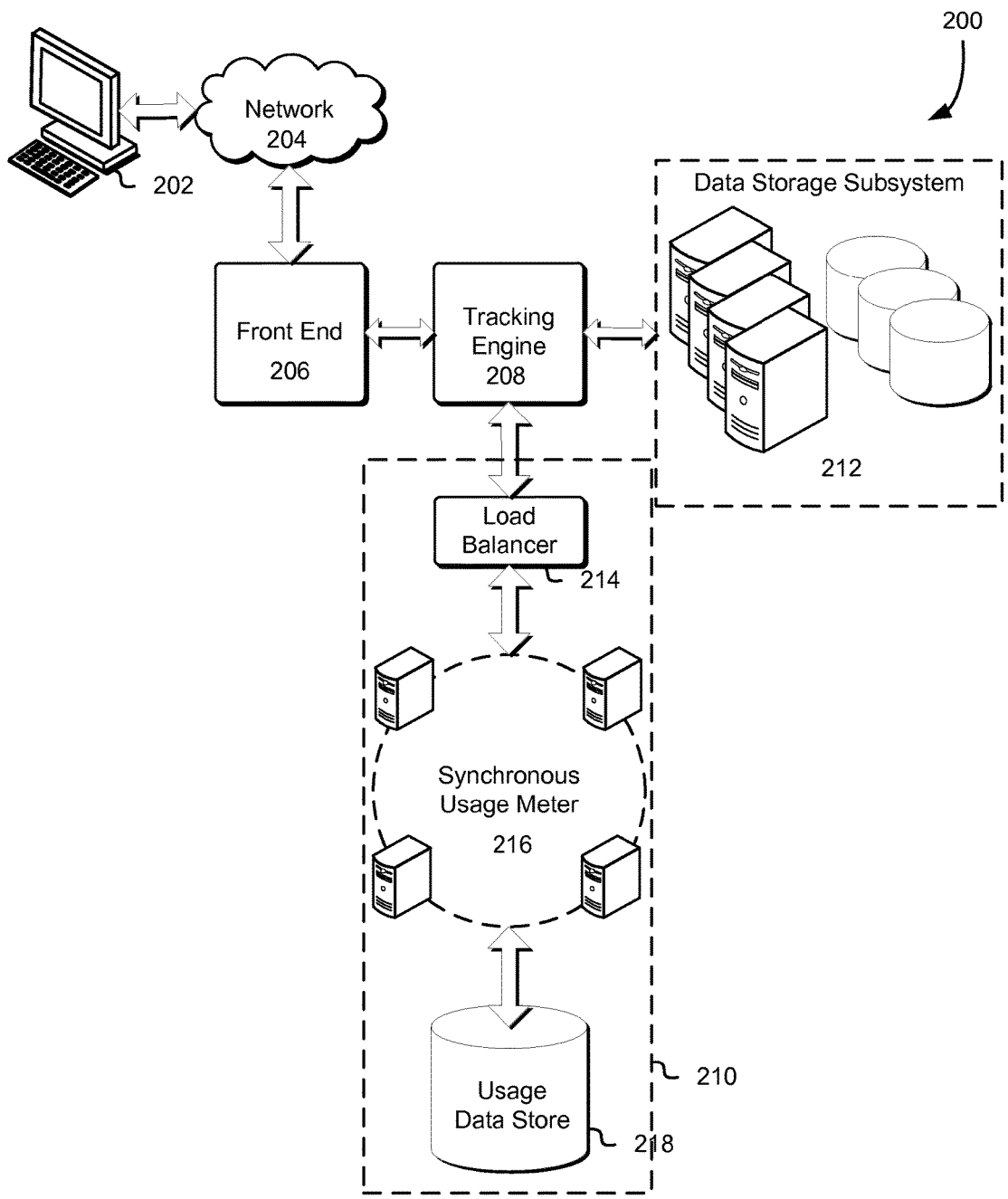
FIG. 2 illustrates an environment in which a usage subsystem, including a synchronous usage meter, is configured to respond synchronously to data storage requests, in accordance with some embodiments.

FIG. 2 illustrates an environment in which a usage subsystem, including a synchronous usage meter, is configured to respond synchronously to data storage requests, in accordance with some embodiments. A data storage request transits between a customer device 202 and a data storage system, including a front end 206, a tracking engine 208, a usage subsystem 210, and a data storage subsystem 212, in a similar fashion as described above in connection with FIG. 1 (e.g., to and from customer device 102 and front end 106, tracking engine 208, usage subsystem 110, and data storage subsystem 112 via network 104). The illustrated embodiment depicts a synchronous implementation of the usage subsystem 210.

In the illustrated embodiment, the usage subsystem 210 includes a load balancer 214, a synchronous usage meter 216, and a usage data store 218. The load balancer 214 may be any component, service, or other entity capable of distributing computing workloads and/or traffic, such as application and network traffic, across a number of servers so as to increase the capacity and/or reliability of services reliant thereon. The load balancer 214 routes incoming usage determination requests (as derived from incoming data storage requests) to one or more hosts or other computing devices of a synchronous usage meter 216 for processing. As may be contemplated, in a data storage system handling a large volume of incoming data storage requests at any given point in time, the synchronous usage meter 216 may utilize one or more techniques for parallelizing and otherwise spreading and/or equalizing processing load between one or more hosts.

In one embodiment, the synchronous usage meter includes a plurality of hosts or other computing devices arranged in an implementation of a consistent hash ring. In such an embodiment, the use of consistent hashing mechanisms and techniques allows lookups (e.g., of usage policies, current usage associated with the request or its requesting customer), processing, and the like, to be spread in a random or pseudo-random fashion across the hosts of the hash ring, and such that the updating, addition, or deletion of the associated records (e.g., usage policies) or hosts/computing devices does not require reindexing or manual redistribution of the records across the computing devices on the ring. Furthermore, as the synchronous usage meter 216 presents a single access point to and from the load balancer, as well between the meter 216 and a usage data store 218, utilization of the usage data store is considerably decreased for a given lookup operation.

The synchronous usage meter 216 locates an appropriate host or other computing device within the synchronous usage meter, e.g., by finding one or more applicable appropriate records and traversing the hash ring to the nearest appropriate computing device, which then submits a query to the usage data store to obtain one or more usage policies related to the request. The usage policies may be related to the request based on the time at which the request was submitted, the identity of the customer, other policies in effect at the time of the request or during the duration of the request, and the like. The synchronous usage meter 216 makes the determination based on the information obtained, and passes the determination back to the tracking engine for further disposition of the data storage request in accordance. As previously mentioned, the determination may be a full denial, a full approval, or a conditional and/or partial approval/denial. In the case of a conditional and/or partial approval/denial, the request may be partially approved in the sense that, for example, only some of the data is stored or retrieved (e.g., up to a usage policy limit). Another example is that the request may be fully approved and executed, but held in abeyance or stretched until such time as, e.g., system load has decreased, or until a later period of time when current usage (e.g., by the customer) is sufficiently lower than the applicable usage policy limit so as to fully service the request.

In some embodiments, usage determinations, usage policy updates, usage policy retrievals, and the like, are stored in temporary memory of one or more of the hosts of the synchronous usage meter, so as to enable quicker access and decrease static load on, e.g., the usage data store. In such embodiments, a process or thread associated with the computing resource service provider, the usage subsystem, or one or more of the hosts, may periodically (or, in some cases, manually or in response to an event) sweep and/or synchronize the usage policies, determinations, and the like, to the usage data store from the respective memories of the hosts, rather than immediately or synchronously transacting such information directly with the usage data store. In some embodiments, events, usage policies, usage information, and the like, are flushed to the data store in response to an entity, such as that of the usage subsystem or the tracking engine, detecting that such information is stale, i.e., not accessed and/or updated for a predetermined length of time.

In the illustrated embodiment, the determination, as described above, is provided synchronously back to the requestor (e.g., via the customer device 302), so as to enable the requestor to immediately receive feedback and take further actions as necessary (e.g., resubmit the request at a later time, adjust the content of the request, etc.). Although a consistent hash ring is illustrated, other implementations of synchronously providing usage determinations are contemplated hereby.

Figure 3:
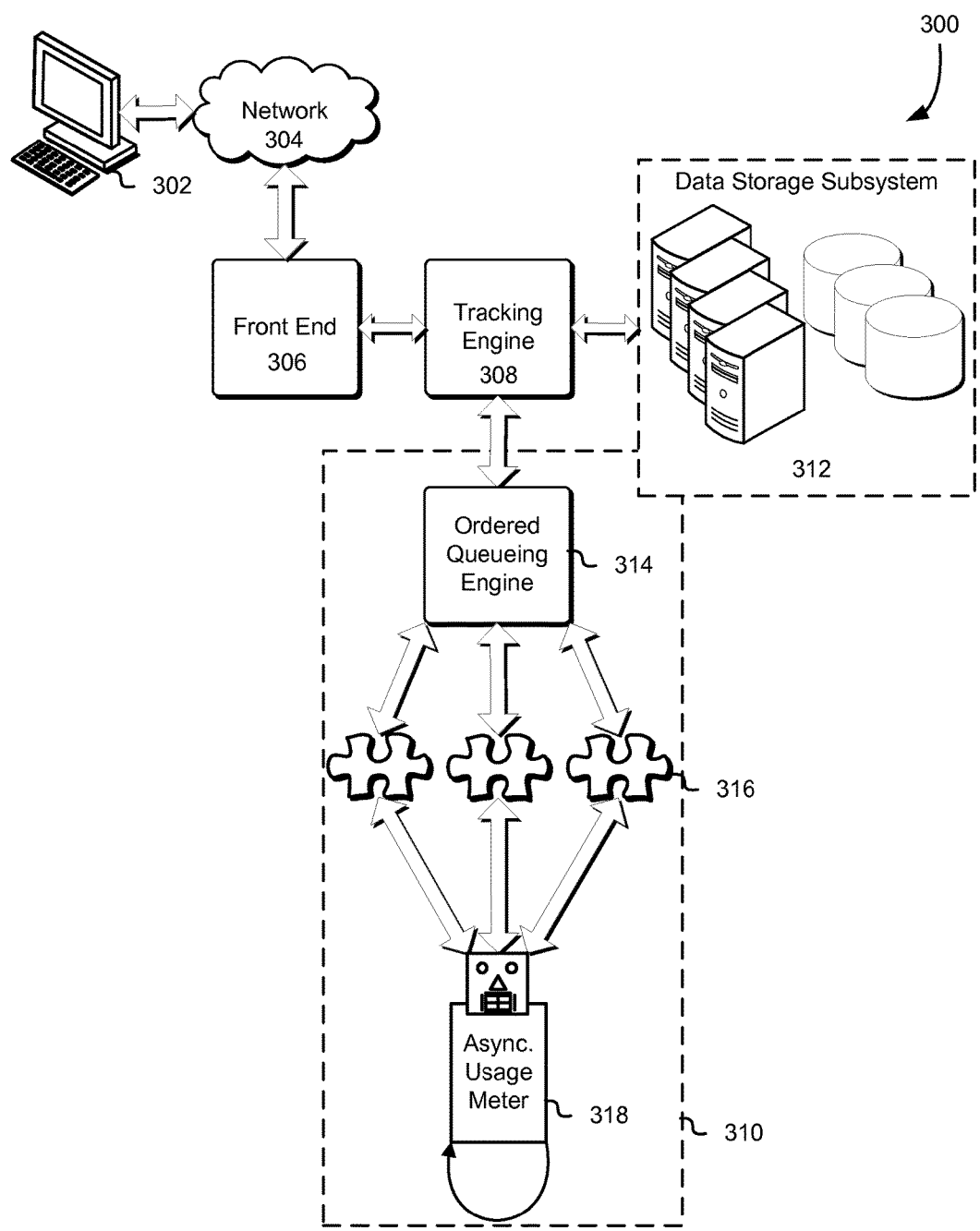
FIG. 3 illustrates an environment in which a usage subsystem, including an ordered queueing engine and an asynchronous usage meter, is configured to respond asynchronously to data storage requests, in accordance with some embodiments.

FIG. 3 illustrates an environment in which a usage subsystem, including an ordered queueing engine and an asynchronous usage meter, is configured to respond asynchronously to data storage requests, in accordance with some embodiments. A data storage request transits between a customer device 302 and a data storage system, including a front end 306, a tracking engine 308, a usage subsystem 310, and a data storage subsystem 312, in a similar fashion as described above in connection with FIGS. 1-2 (e.g., to and from customer device 102 and front end 106, tracking engine 108, usage subsystem 110, and data storage subsystem 112 via network 104). The illustrated embodiment depicts an asynchronous implementation of the usage subsystem 310.

As illustrated, the usage subsystem 310 includes an ordered queueing engine 314, which is capable of strongly ordering (e.g., guaranteeing the processing and presentation order of) incoming requests, and further idempotently allocating requests to a specific data segment or fragment of a plurality of such data segments or fragments 316, thereby allowing for the requests to be serviced in the same order they were initially received even if a determining host becomes unavailable, if the requests are repeated, etc. The data segments or fragments 316 may be containers for the agglomeration of requests (or related information), and may themselves be locally indexed using, e.g., hashing routines, queues, and the like.

An asynchronous usage meter 318, which may include one or more hosts capable of making a determination of a request's expected data usage against an usage policy applicable at the time of the request, traverses the data segments or fragments 316 so as to assess the requests in the order guaranteed by the ordered queueing system 314. The hosts of the asynchronous usage meter 318 hold information regarding the applicable usage policies in transient memory associated therewith, make the determination, then pass the result back to the tracking engine 308 asynchronously for further processing and/or notification (e.g., to the customer device). In the illustrated asynchronous embodiment, the asynchronous usage meter 318 may have more resources at its disposal, or may take a longer length of time to make a determination, on account of not needing to respond synchronously to the request.

Figure 4:
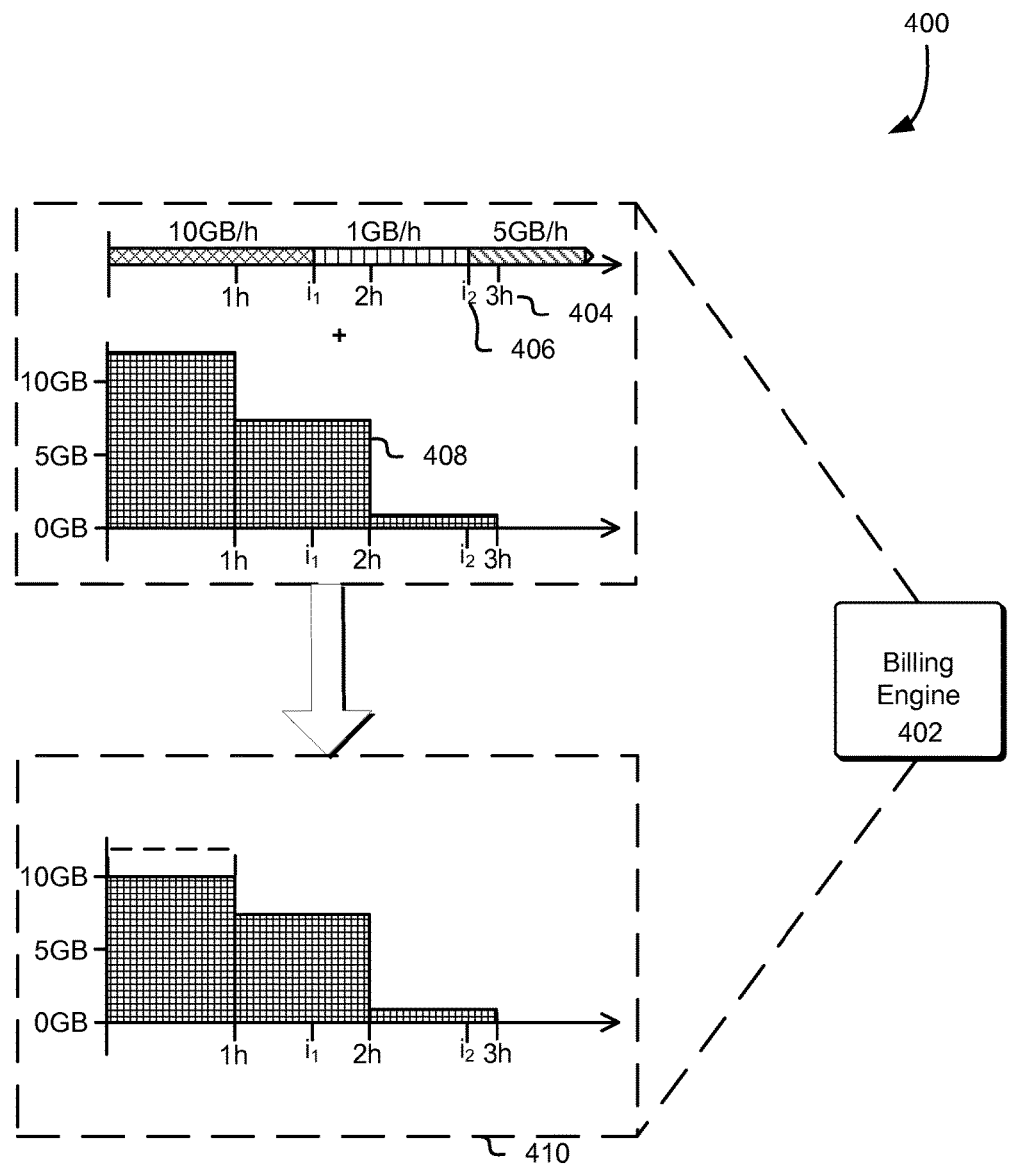
FIG. 4 illustrates an example of billing engine functionality, such as the ability to assess usage data against usage policies and time intervals, in accordance with some embodiments.

FIG. 4 illustrates an example of billing engine functionality, such as the ability to assess usage data against usage policies and time intervals, in accordance with some embodiments. A billing engine 402, which may be similar in implementation to billing engine 114 described above in connection with FIG. 1, receives instructions to calculate an effective usage amount so as to bill a customer for usage over a specified period of time. The billing engine 402 assesses the applicable usage policies in effect over the specified period of time, such as defined by a customer and/or the data storage system as previously discussed, for both a specified interval 404 (here, illustrated as hourly) over the period of time, and at specific points during the period of time when the usage policies change 406 (illustrated as i2 and i3), to generate a complex usage policy for the specified period of time.

In some embodiments, the billing engine, or other entity of the computing resource service provider, limits the frequency with which usage policies are updated by the customer, such as over a specified period of time. Furthermore, the usage policies used by the billing engine in its calculations may be entirely or partially selectable by, e.g., a customer to which they pertain. For example, a customer may instruct the billing engine to apply a usage policy that is time-bound, rather than data bound. As another example, a customer may instruct the billing engine to derestrict the usage calculation made by the billing engine, e.g., cause the billing engine to disregard all usage policies.

The billing engine 402 obtains the usage pattern 408 for, e.g., the requesting customer, over the specified period of time, and assesses whether any of the usage violates the complex usage policy, so as to remove any usage overage prior to billing 410 (e.g., so as to not bill the customer over the maximum limit set, for example, in the event of a failure of the usage subsystem or as a result of granted exceptions to the usage policies in effect at the time of the requests). The billing engine 402 calculation may take into further account the start and end of a given storage job associated with a data storage request, and to the extent that usage policy changes occur during the storage job, the change does not take effect until after the job is complete. In such examples, the actual usage policy in effect at the start of a given job governs, even if it is higher than the limit later set. In the illustrated example, if a job starts before policy change timepoint i1 but ends after timepoint i1 but before timepoint i2, the usage limit remains 10 GB per hour, even for the time interval between 1 hour and 2 hours, as well as between 2 hours and 3 hours (if the job ends between hours 2 and 3). Thus, the customer would be billed at the 10 GB/h rate for the duration of the job, rather than at the lower 1 GB rate between timepoints i1 and i2. Similarly, the usage subsystem may allow such jobs to be executed even if they eventually exceed the usage limits later imposed, so long as the usage limit at the time of request and/or job initiation is sufficient to support the requested usage.

Figure 5:
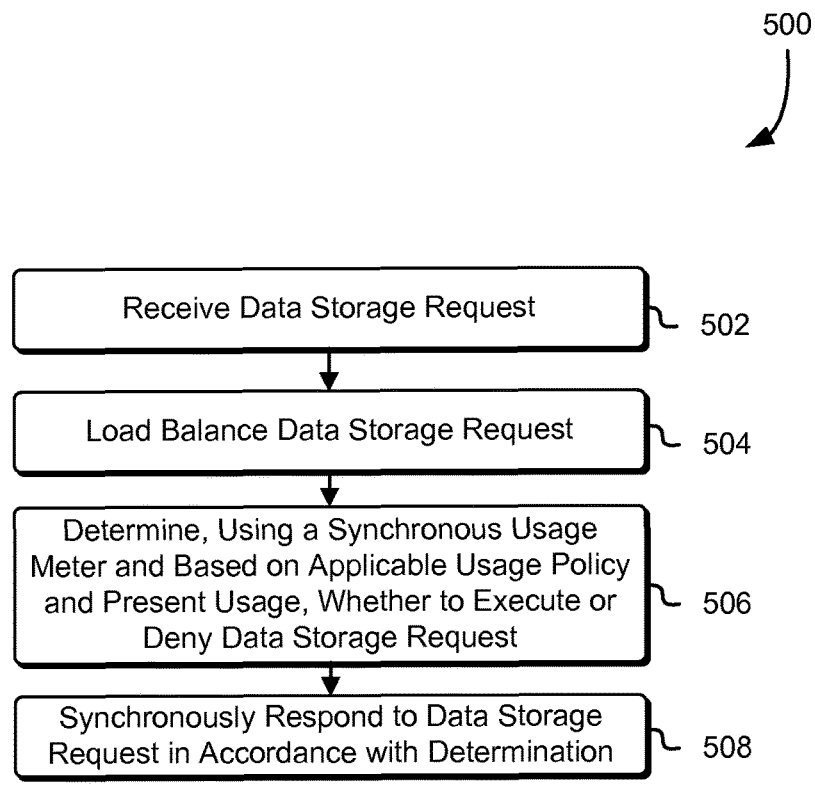
FIG. 5 illustrates an example process for synchronously assessing data storage requests against usage policies, in accordance with some embodiments.

FIG. 5 illustrates an example process for synchronously assessing data storage requests against usage policies, in accordance with some embodiments. At step 502, an entity, such as a front end of a data storage system as described in greater detail above in connection with at least FIGS. 1-4, receives a data storage request, such as from a customer device as described in greater detail above in connection with at least FIGS. 1-4. The data storage request may be a request to store, retrieve, delete, move, or otherwise manipulate data stored on or in connection with the data storage system, such as on the data storage subsystem.

At step 504, the incoming data storage request is load balanced, using a load balancer as previously discussed in connection with at least FIGS. 1-4, so as to appropriately distribute further processing of the request to, e.g., a usage subsystem that includes a synchronous usage meter as previously described. As mentioned in connection with at least FIGS. 1-4, the synchronous usage meter may implement consistent hashing techniques, and the hosts thereof may be arranged in a consistent hashing ring, which in turn may have access to a usage data store having the applicable usage policies, or information relating to such usage policies, stored thereon.

At step 506, the usage subsystem synchronously determines the applicable usage policy as well as the present level of usage (e.g., at the time of request), so as to further determine whether the system is to approve or deny the request. As previously discussed, the system may also conditionally or partially approve or deny the request. After the determination is made, at step 508, the determination is further processed, in part by synchronously (relative to the request) responding to the request with the determination. In the case where the request is partly or fully approved, the request is submitted to, e.g., the data storage subsystem, for fulfillment.

Figure 6:
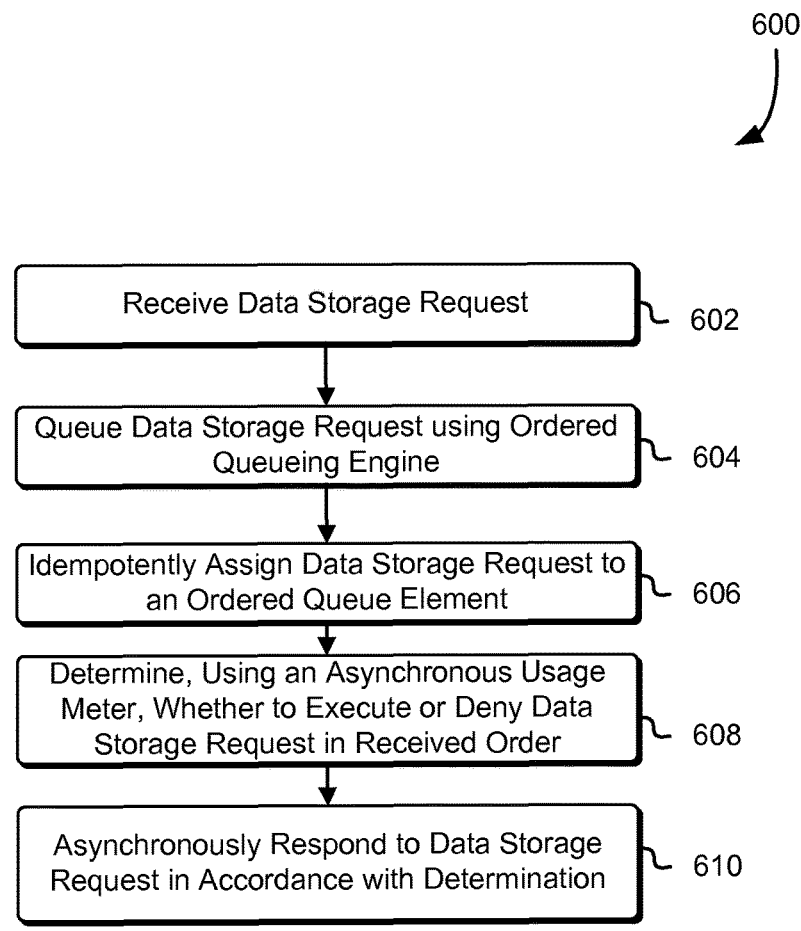
FIG. 6 illustrates an example process for asynchronously assessing data storage requests against usage policies, in accordance with some embodiments.

FIG. 6 illustrates an example process for asynchronously assessing data storage requests against usage policies, in accordance with some embodiments. At step 602, an entity, such as a front end of a data storage system as described in greater detail above in connection with at least FIGS. 1-5, receives a data storage request, such as from a customer device as described in greater detail above in connection with at least FIGS. 1-5. The data storage request may be a request to store, retrieve, delete, move, or otherwise manipulate data stored on or in connection with the data storage system, such as on the data storage subsystem.

At step 604, the data storage request is placed, such as by a tracking engine, in a queue, such as an ordered queueing engine as previously discussed. As mentioned, the ordered queueing engine may provide guarantees as to the ordering of requests and other processing routines, and may also provide idempotency for the incoming requests.

At step 606, as mentioned, the data storage requests are idempotently assigned to an ordered queue element, such as a data element as previously discussed. At step 608, an asynchronous usage meter, as discussed above in connection with at least FIGS. 1-5, asynchronously determines the applicable usage policy as well as the present level of usage (e.g., at the time of request), so as to further determine whether the system is to approve or deny the request. As previously discussed, the system may also conditionally or partially approve or deny the request. After the determination is made, at step 610, the determination is further processed, in part by asynchronously (relative to the request) responding to the request with the determination. In the case where the request is partly or fully approved, the request is submitted to, e.g., the data storage subsystem, for fulfillment.

Figure 7:
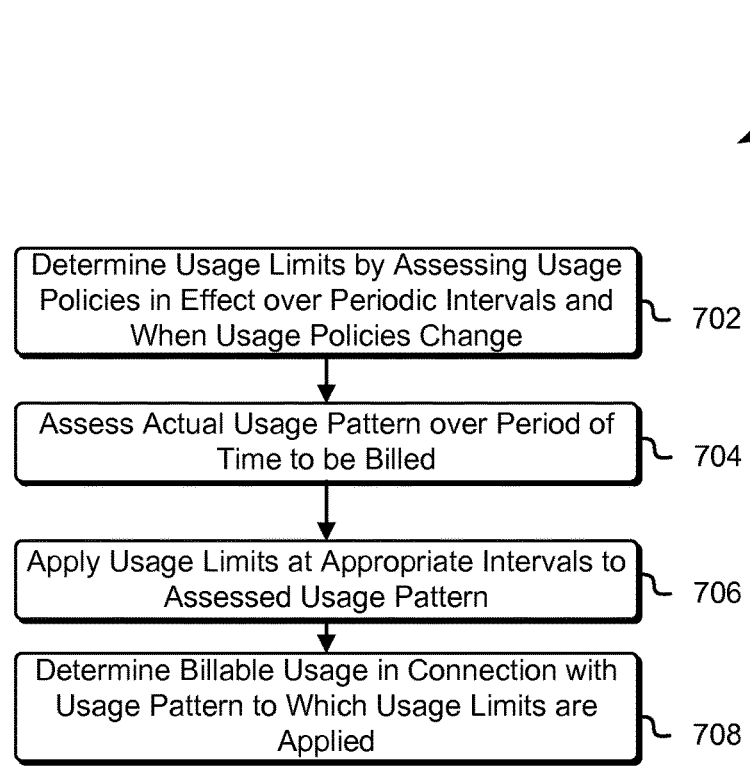
FIG. 7 illustrates an example process for processing usage data, in accordance with some embodiments.

FIG. 7 illustrates an example process for processing usage data, in accordance with some embodiments. At step 702, an entity, such as a billing engine described above in connection with at least FIGS. 1-4, determines effective usage limits by assessing the usage policies in effect over a given period of time. As previously discussed, the billing engine may do so by assessing both the usage policies in effect at given periodic intervals of, e.g., time, number of requests, etc., as well as setting timepoints when usage policies change (asynchronously with the periodic interval).

At step 704, the actual usage pattern over the period of time to be billed is assessed against the effective (complex) usage policy determined in connection with step 702, and at step 706, the complex usage limits are applied to appropriate intervals to the usage patterns determined in step 704. As previously discussed, these actions allow the billing system to maximize monetization of usage, while similarly maximizing system availability for customer requests. At step

708, the billable usage over the period of time assessed in step 702, is calculated by the billing engine, and the amount is charged to, e.g., the customer or the requestor.

Figure 8:
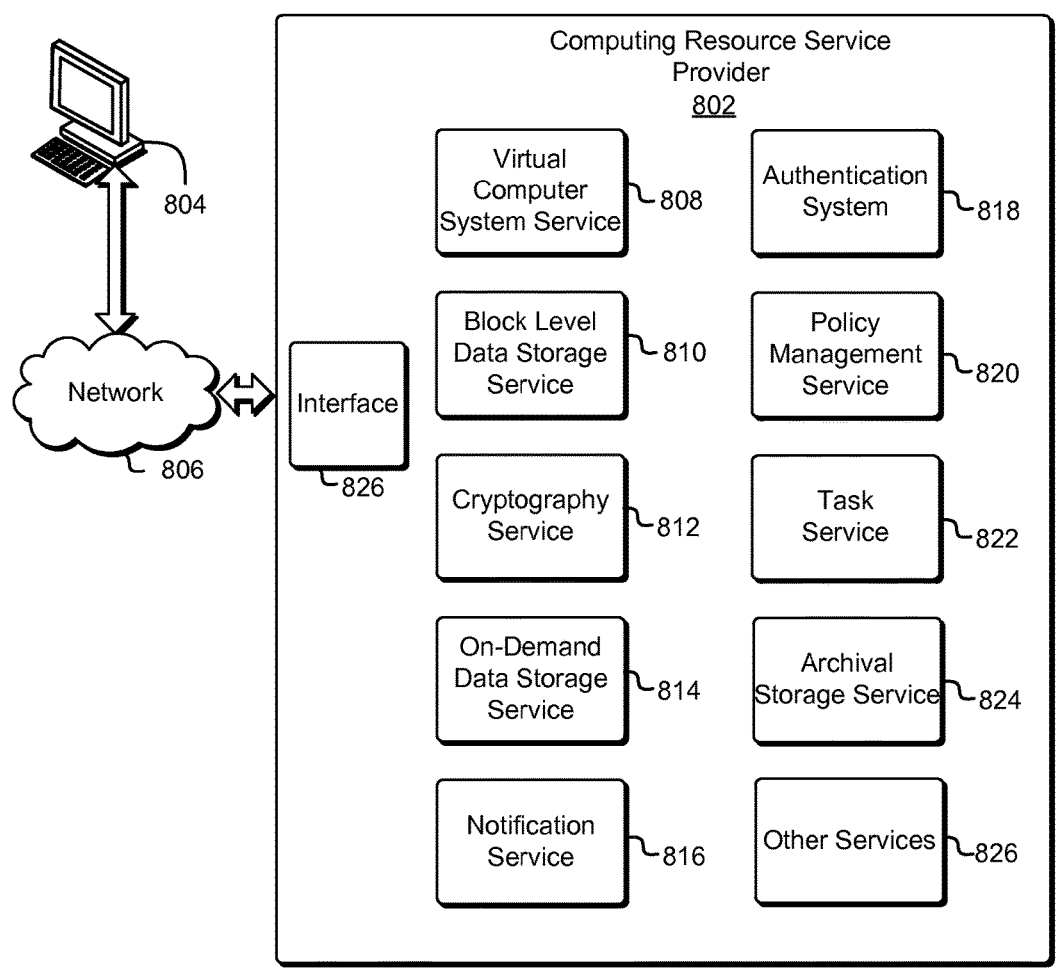
FIG. 8 shows an example of a customer connected to a computing resource service provider in accordance with at least one embodiment.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described include the services 808-824 described with reference to FIG. 8 and additional services may be provided in addition to or as an alternative to services explicitly described. As described, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 812 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects that may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to check periodically or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources) configured to perform operations involved in authentication of users of the customer. For instance, one of the services 808-816 and 820-824 may provide information from a user to the authentication system 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 824 may configure the one or more instantiated virtual machines or virtual hosts to operate using a selected operating system and/or a selected execution application in accordance with a requirement of the customer 804.

The computing resource service provider 802 further includes an archival storage service 824. The archival storage service 824 may comprise a collection of computing resources that collectively operate to provide storage for data archiving and backup of customer data. The data may comprise one or more data files that may be combined to form an archive. The archival storage service 824 may be configured to persistently store data that may be infrequently accessed and for which long retrieval times are acceptable to a customer utilizing the archival storage service 824. A customer may interact with the archival storage service 824 (for example, through appropriately configured API calls made to the archival storage service 824) to generate one or more archives, upload and retrieve the one or more archives or monitor the generation, upload or retrieval of the one or more archives.

The computing resource service provider 802 additionally maintains one or more other services 826 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Figure 9:
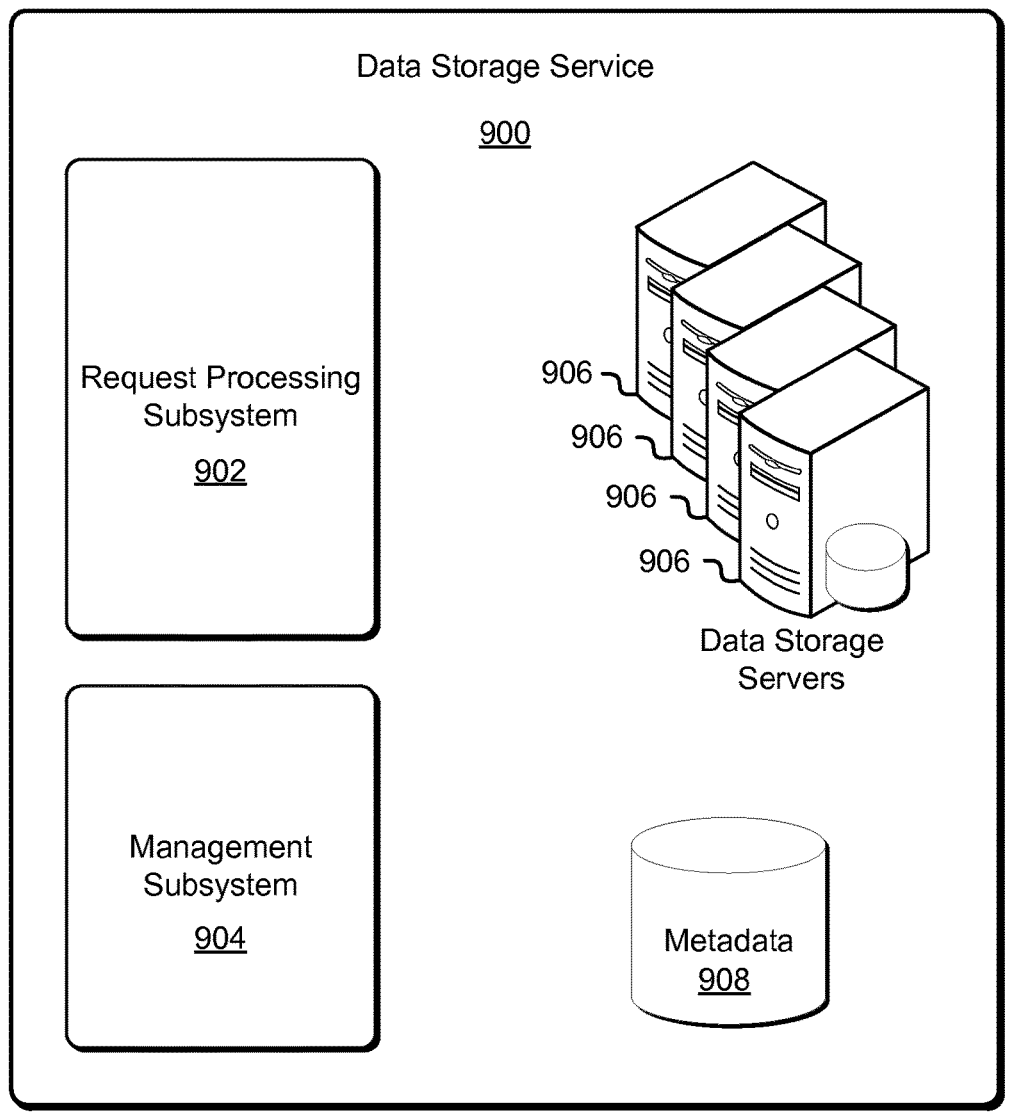
FIG. 9 shows an illustrative example of a data storage service in accordance with various embodiments.

FIG. 9 shows an illustrative example of a data storage service in accordance with various embodiments. The data storage service 900 may be a service of a computing resource provider used to operate an on-demand data storage service such as described above in connection with FIG. 5. As illustrated in FIG. 9, the data storage service 900 includes various subsystems such as a request processing subsystem 902 and a management subsystem 904. The data storage service 900 may also include a plurality of data storage servers 906 and a metadata storage 908, which may store metadata about various data objects stored among the data storage servers 906 as described. In an embodiment, the request processing subsystem 902 is a collection of computing resources, such as webservers and application servers, collectively configured to process requests submitted to the data storage service 900. The request processing subsystem 902, for example, may include one or more webservers that provide a web service interface to enable customers of the data storage service 900 to submit requests to be processed by the data storage service 900. The request processing subsystem 902 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 900 (e.g., through network communications). For example, some requests submitted to the request processing subsystem 902 may involve the management of computing resources which may include data objects stored by the data storage servers 906. The request processing subsystem 902, for example, may receive and process requests to modify computing resources. For instance, in some examples, data objects are logically organized into logical data containers. Data objects associated with a logical data container may, for example, be said to be in the logical data container. Requests to the data processing subsystem 902 may include requests for creating logical data containers, deleting logical data containers, providing an inventory of a logical data container, providing or updating access control policy with respect to one or more logical data containers and the like.

The requests may be processed by the management subsystem 904 upon receipt by the request processing subsystem 902. If applicable, various requests processed by the request processing subsystem 902 and/or management subsystem 904, may result in the management subsystem 904 updating metadata associated with data objects and logical data containers stored in the metadata store 908. Other requests that may be processed by the request processing subsystem 902 include requests to perform operations in connection with data objects. The requests, for example, may include requests to upload data objects to the data storage service 900, to download data objects from the data storage service 900, to delete data objects stored by the data storage service 900 and/or other operations that may be performed.

Requests processed by the request processing subsystem 902 that involve operations on data objects (upload, download, delete, e.g.) may include interaction between the request processing subsystem 902 and one or more data storage servers 906. The data storage servers 906 may be computer system communicatively coupled with one or more storage devices for the persistent of data objects. For example, in order to process a request to upload a data object, the request processing subsystem may transmit data to a data storage server 906 for persistent storage. It is noted, however, that in some embodiments, client (e.g., customer) computer systems may transmit data directly to the data storage servers 906 instead of through severs in the request processing subsystem.

In some embodiments, the request processing subsystem 902 transmits data to multiple data storage servers 906 for the purposes of redundantly storing the data to allow the retrievability of data in the event of failure of an individual data storage server 906 and/or associated data storage device. For example, in some embodiments, the request processing subsystem uses a redundancy in coding scheme such as erasure coding to deconstruct a data object into multiple parts that are stored among the data storage servers 906. The parts may be configured such that if access to a certain number of parts is lost, the data object may nevertheless be reconstructible from the remaining parts that remain accessible.

To enable efficient transfer of data between the request processing subsystem 902 and the data storage servers 906 and/or generally to enable quick processing of requests, the request processing subsystem 902 may include one or more databases that enable the location of data among the data storage servers 906. For example, the request processing subsystem 902 may operate a key value store that serves to associate identifiers of data objects with locations among the data storage servers 906 for accessing data of the data objects.

Figure 10:
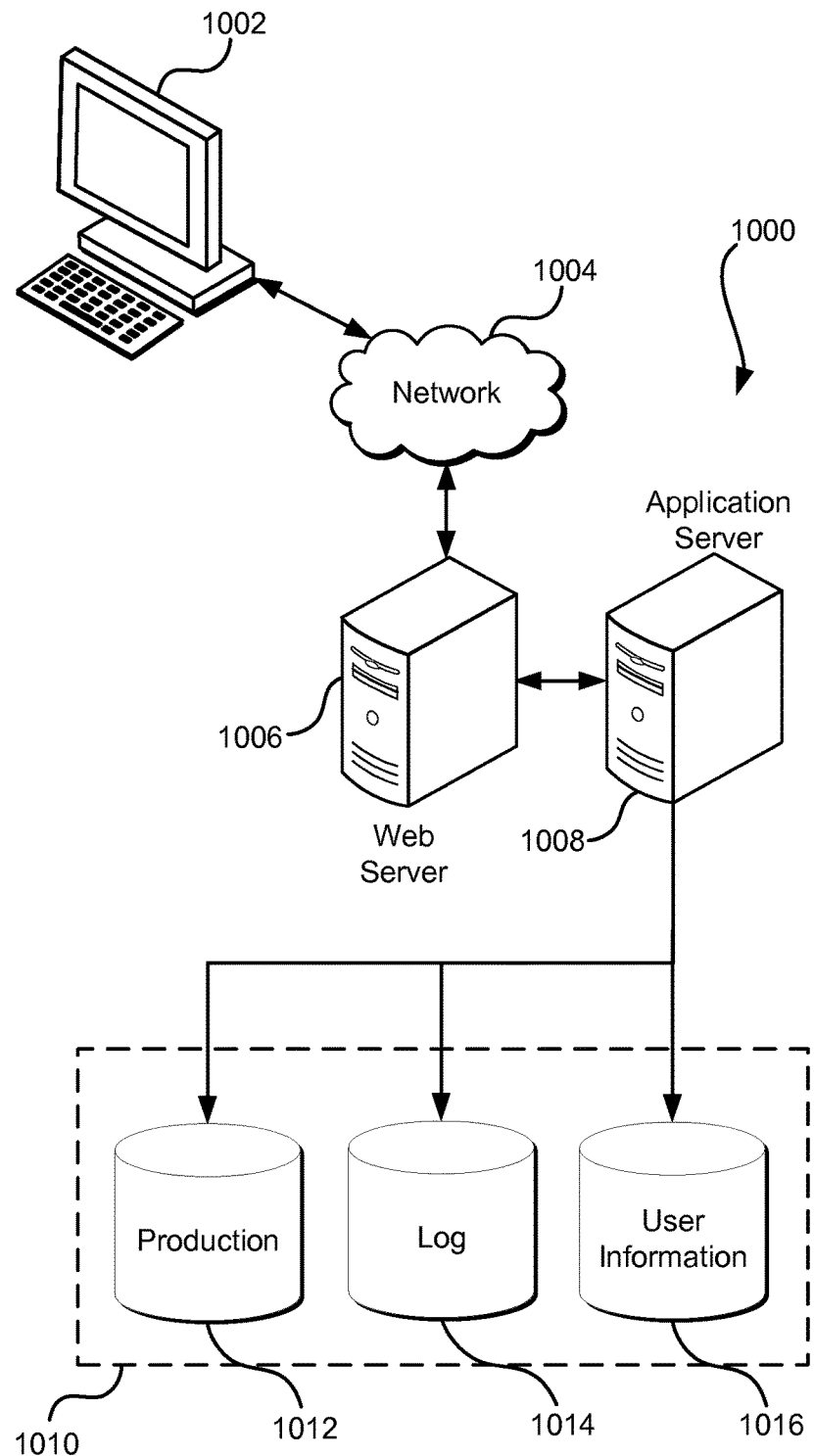
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   in response to a data storage request of a plurality of data storage requests to store data, analyzing the data storage request by at least:
      selecting a host of a synchronous usage meter to analyze the data storage request, the host having access to a usage data store having stored thereon current information regarding at least one usage policy associated with the data storage request;
      causing the selected host to analyze the data storage request against the at least one usage policy so as to make a determination whether the data storage request is to be executed or denied;
      as a result of determining that the determination is invalid,
   storing the data in accordance with the data storage request; and
      as a result of determining that a different determination, by the selected host and against the at least one usage policy, is valid, conditionally executing a different data storage request subject to the different determination.

2. The computer-implemented method of claim 1, further comprising analyzing, for a first period of time, a subset of the plurality of data storage requests, the subset associated with a customer of a plurality of customers, by at least:
   determining a subset, applicable to the first period of time, of a plurality of usage policies that are associated with the subset of the plurality of data storage requests;
   for each interval of a plurality of intervals of the first period of time, determining an effective usage limit from the subset of the plurality of usage policies, wherein the plurality of intervals are terminated by at least one of time or policy change; and
   applying, for each interval of the plurality of intervals that is terminated by time, the effective usage limit to a usage pattern of the customer over the first period of time.

3. The computer-implemented method of claim 2, wherein the first period of time is coincident with a time length of the data storage request.

4. The computer-implemented method of claim 1, wherein the synchronous usage meter includes a plurality of hosts arranged in accordance with a consistent hashing mechanism implemented on the plurality of hosts.

5. A system, comprising:
   at least one computing device that implements one or more services to:
      forward incoming data storage requests received from a customer device via a front end to a tracking engine;
      cause the tracking engine to send information related to the data storage requests to a usage subsystem;
      cause the usage subsystem to determine, based on one or more usage policies associated with the incoming data storage requests, whether to deny or execute the incoming data storage requests;
      if the tracking engine detects that the determination of the usage subsystem of whether to deny or execute the incoming data storage requests is invalid, execute a subset of the incoming data storage requests associated with the invalid determinations by storing the data on a data storage subsystem in accordance with the sub set;
      execute a remainder of the incoming data storage requests, the remainder being associated with valid determinations of the usage subsystem, conditioned on outcomes associated with the valid determinations; and
      respond, via the front end, to the customer device with information regarding execution status of the respective incoming data storage requests.

6. The system of claim 5, wherein the one or more services further respond synchronously relative to the data storage requests.

7. The system of claim 5, wherein the usage subsystem includes a synchronous usage meter.

8. The system of claim 5, wherein the one or more services are configured to respond asynchronously relative to the data storage requests.

9. The system of claim 5, wherein the usage subsystem includes at least:
   an ordered queueing engine that is capable of guaranteeing an order in which requests are serviced by the ordered queueing engine, and further capable of idempotently associating the requests to data constructs; and
   an asynchronous usage meter that traverses the data constructs so as to analyze the requests in the guaranteed order.

10. The system of claim 5, wherein the one or more services further analyze a second subset of the data storage requests that were executed so as to determine whether the data storage requests complied with the one or more usage policies.

11. The system of claim 10, wherein the one or more services analyze the second subset so as to reduce the effective amount of usage billed in connection with the data storage requests over a period of time.

12. The system of claim 11, wherein the one or more usage policies include at least one usage policy that includes a usage limit for the period of time.

13. A non-transitory computer-readable storage medium having stored thereon executable instructions that, if executed by one or more processors of a computer system, cause the computer system to at least:
   process, using a tracking engine, incoming data storage requests received from a customer device so as to cause a usage subsystem to determine, based on or more usage policies associated with the incoming data storage requests, whether to deny or execute the incoming data storage requests;
   as a result of determining that the usage subsystem is unavailable to the tracking engine:

execute a subset of the data storage requests by storing the data on a data storage subsystem in accordance with the subset; and respond, to the customer device, with at least information that the subset of the incoming data storage requests are executed; and as a result of determining that the usage subsystem is available to the tracking engine, service a remainder of the incoming data storage requests in accordance with a determination of the tracking engine of whether to deny or execute the remainder.

14. The non-transitory computer-readable storage medium of claim 13, wherein the instructions further comprise instructions that, if executed by the one or more processors, cause the computer system to respond synchronously relative to the data storage requests.

15. The non-transitory computer-readable storage medium of claim 13, wherein the instructions further comprise instructions that, if executed by the one or more processors, cause the computer system to respond asynchronously relative to the data storage requests.

16. The non-transitory computer-readable storage medium of claim 15, wherein the usage subsystem implements an ordered queueing engine that guarantees an order of servicing of incoming requests.

17. The non-transitory computer-readable storage medium of claim 13, wherein the usage subsystem includes a synchronous usage meter that implements a consistent hashing mechanism.

18. The non-transitory computer-readable storage medium of claim 13, wherein the data storage subsystem encodes data with a redundancy code in connection with storing the data.

19. The non-transitory computer-readable storage medium of claim 13, wherein the instructions further comprise instructions that, if executed by the one or more processors, cause the computer system to analyze a second subset of the data storage requests that were executed so as to determine whether the data storage requests complied with the one or more usage policies.

20. The non-transitory computer-readable storage medium of claim 19, wherein the instructions further comprise instructions that, if executed by the one or more processors, cause the computer system to, if the servicing of the incoming data storage requests fails, update the usage subsystem to reflect a usage level that accounts for the failure.

* * * * *